(12) United States Patent
Bass et al.

(10) Patent No.: US 12,027,686 B2
(45) Date of Patent: Jul. 2, 2024

(54) SYSTEM AND METHOD FOR THERMALLY ROBUST ENERGY STORAGE SYSTEM

(71) Applicant: Allison Transmission, Inc., Indianapolis, IN (US)

(72) Inventors: Edward Bass, Chambersburg, PA (US); Felice Bailey, Indianapolis, IN (US); Richard Bletsis, Kokomo, IN (US); Derek Delrymple, Kokomo, IN (US); Dean Ford, Noblesville, IN (US); Bruce Miller, Livemore, CO (US); Markus Naegeli, Kokomo, IN (US); Steven Reyburn, Kokomo, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 576 days.

(21) Appl. No.: 17/304,244

(22) Filed: Jun. 17, 2021

(65) Prior Publication Data

US 2021/0313639 A1    Oct. 7, 2021

Related U.S. Application Data

(60) Division of application No. 16/431,917, filed on Jun. 5, 2019, now Pat. No. 11,289,755, which is a division
(Continued)

(51) Int. Cl.
*H01M 10/6572* (2014.01)
*H01M 10/613* (2014.01)
(Continued)

(52) U.S. Cl.
CPC ..... *H01M 10/6569* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS 5,422,558 A    6/1995  Stewart
5,456,994 A    10/1995 Mita
(Continued)

FOREIGN PATENT DOCUMENTS

CN    1898819 A      1/2007
CN    101978549 A    2/2011
(Continued)

OTHER PUBLICATIONS

Machine translation of DE-102008059952-A1.*
(Continued)

*Primary Examiner* — Haixia Zhang
(74) *Attorney, Agent, or Firm* — Woodard, Emhardt, Henry, Reeves & Wagner, LLP

(57) ABSTRACT

Various systems for cooling a battery cell array are described. In one example an energy storage system includes a housing enclosing a battery cell array, an evaporator, and a circulating pump. In another example, an evaporator is adjacent to battery cells to facilitate heat transfer. In another example, thermoelectric elements are positioned adjacent to battery cells to facilitate heat transfer.

18 Claims, 7 Drawing Sheets

Related U.S. Application Data of application No. 14/845,758, filed on Sep. 4, 2015, now Pat. No. 10,573,943, which is a continuation of application No. PCT/US2014/020986, filed on Mar. 6, 2014.

(60) Provisional application No. 61/782,282, filed on Mar. 14, 2013.

(51) Int. Cl.
    *H01M 10/625*     (2014.01)
    *H01M 10/6563*     (2014.01)
    *H01M 10/6569*     (2014.01)
    *H01M 6/50*     (2006.01)
    *H01M 10/60*     (2014.01)

(52) U.S. Cl.
CPC ... *H01M 10/6563* (2015.04); *H01M 10/6572* (2015.04); *H01M 6/5038* (2013.01); *H01M 10/60* (2015.04); *H01M 2220/20* (2013.01)

(56) References Cited

U.S. PATENT DOCUMENTS

| | | |
|---|---|---|
| 5,756,227 A | 5/1998 | Suzuki et al. |
| 6,043,629 A | 3/2000 | Ashley et al. |
| 6,106,972 A | 8/2000 | Kokubo et al. |
| 6,274,950 B1 | 8/2001 | Gottlieb et al. |
| 6,422,027 B1 | 7/2002 | Coates, Jr. et al. |
| 6,512,347 B1 | 1/2003 | Hellmann et al. |
| 6,919,707 B2 | 7/2005 | Kawai et al. |
| 7,019,488 B2 | 3/2006 | Nakeo |
| 7,061,208 B2 | 6/2006 | Nishihata et al. |
| 7,297,438 B2 | 11/2007 | Kimoto |
| 7,553,583 B2 | 6/2009 | Eaves |
| 7,572,549 B2 | 8/2009 | Wegner |
| 7,612,472 B2 | 11/2009 | Mutabdzija et al. |
| 7,642,753 B2 | 1/2010 | Simpson et al. |
| 7,772,799 B2 | 8/2010 | Wu |
| 2006/0060236 A1 | 3/2006 | Kim |
| 2006/0216582 A1 | 9/2006 | Lee et al. |
| 2007/0141455 A1 | 6/2007 | Marukawa et al. |
| 2008/0003495 A1 | 1/2008 | Shimizu |
| 2008/0050645 A1 | 2/2008 | Kai et al. |
| 2009/0071178 A1 | 3/2009 | Major |
| 2009/0142653 A1 | 6/2009 | Okada et al. |
| 2009/0246606 A1 | 10/2009 | Shimizu |
| 2010/0025125 A1 | 2/2010 | Bienert et al. |
| 2010/0112419 A1 | 5/2010 | Jang et al. |
| 2010/0141062 A1 | 6/2010 | Chamberlin et al. |
| 2010/0275619 A1 | 11/2010 | Koetting et al. |
| 2011/0020676 A1 | 1/2011 | Kurosawa |
| 2011/0206948 A1 | 8/2011 | Asai et al. |
| 2012/0003510 A1 | 1/2012 | Eisenhour |
| 2012/0009455 A1 | 1/2012 | Yoon |
| 2012/0282497 A1 | 11/2012 | Yang et al. |
| 2013/0004822 A1 | 1/2013 | Hashimoto et al. |
| 2013/0146249 A1 * | 6/2013 | Katayama ........... H01M 10/613 165/46 |

FOREIGN PATENT DOCUMENTS

| | | | |
|---|---|---|---|
| CN | 102163702 A | 8/2011 | |
| CN | 101627501 B | 2/2012 | |
| CN | 202651316 U | 1/2013 | |
| DE | 102008059952 A1 * | 6/2010 | ......... H01M 10/613 |
| DE | 102008059952 B4 | 7/2011 | |
| EP | 2 262 048 A1 | 12/2010 | |
| FR | 2 975 535 A3 | 5/2011 | |
| WO | 2010069712 A1 | 6/2010 | |

OTHER PUBLICATIONS

Chinese Office Action issued in Application No. 201910504304.4, dated Jan. 25, 2022, 15 pgs.
International Search Report and Written Opinion issued in PCT/US2014/020986, dated Jun. 27, 2014, 15 pgs.
Australian Examination Report issued in Application No. 2014241781, dated Dec. 15, 2015, 3 pgs.
Chinse Office Action issued in Application No. 201480007446.5, dated Aug. 23, 2017, 18 pgs.
Chinse Office Action issued in Application No. 201480007446.5, dated Nov. 28, 2016, 16 pgs.
European Search Report issued in Application No. 14775711.6, dated Sep. 30, 2016, 8 pgs.

* cited by examiner

SYSTEM AND METHOD FOR THERMALLY ROBUST ENERGY STORAGE SYSTEM

CROSS REFERENCE TO RELATED APPLICATIONS

This application is a divisional of U.S. application Ser. No. 16/431,917 filed Jun. 5, 2019, which is a divisional of U.S. application Ser. No. 14/845,758 filed Sep. 4, 2015, which is a continuation of International Patent Application No. PCT/US2014/020986 filed Mar. 6, 2014, which claims the benefit of U.S. Provisional Application No. 61/782,282 filed Mar. 14, 2013, which is hereby incorporated by reference in its entirety.

BACKGROUND

The present invention generally relates to an energy storage system, and more particularly, to an energy storage module to be incorporated into a hybrid electric motor vehicle to store high voltage energy.

Vehicles incorporating electric motors require high voltage energy storage systems in order to properly power the motor. High voltage energy storage often encompasses multiple battery cells which are electrically connected together in series. Storage cells, when charging or discharging generate heat due to chemical reactions within the cells, as heat generation is a byproduct of electricity generation. When multiple battery cells are contained in close proximity, as in an array, the heat generated in each cell can become multiplicative throughout the system and can cause problems such as cell thermal runaway which can destroy the storage system. Additionally, for optimal energy efficiency, uniform temperature of the battery cells is preferred. Thus it is advantageous for such storage systems to include a cooling system to cool the battery cells.

Commonly, hybrid and electric energy storage cooling systems use an open system design which allows external air to reach the battery cells. Often these systems use convective heat transfer to reduce the temperatures of the batteries by passing air over the batteries which circulates from an external intake to an external exhaust. These systems are susceptible to problems caused by salt, dust, and other debris that can reach the battery cells by entering the air intake. Open cooling systems do not prevent salt fog or other corrosive materials from reaching the battery cells, even when a filter is used. Salt fog and foreign particles can cause corrosion and unwanted electrical leakage current paths or short circuits to exist in the storage system. Correspondingly, the system can cause a reduced battery cell life compared to a closed system. Open cooling systems can necessitate installation and use of drain plugs to remove foreign substances from the battery enclosure. Additionally, open cooling system designs add volume to the battery array system which causes problems with space-efficient original designs or hybrid retrofit applications.

The above problems as well as other problems with open cooling systems demonstrate a need in the field for alternative cooling systems for battery cell arrays such as various types of closed cooling systems.

SUMMARY

The energy storage systems described herein address several of the issues mentioned above as well as others. The energy storage systems include a housing containing an array of battery cells. The energy storage systems are closed systems such that the internal environments are hermetically sealed. The energy storage systems are designed to provide rapid and efficient heat transfer from the battery cells to the exterior of the housings.

In one example, an evaporator and air circulator are positioned within the housing. The evaporator can include of a series of evaporator coils integrated with a plurality of cooling fins. The air circulator can include a scroll-type fan. The air circulator and evaporator work cooperatively to enable rapid and efficient thermal energy transfer by providing a thermal energy flow path from the battery cells to a refrigerant located in the evaporator.

In other examples, a thermal transfer plate is positioned at the base of the battery cells. An evaporator or evaporator coils are positioned adjacent to the thermal transfer plate. The evaporator works cooperatively with the thermal transfer plate to enable rapid and efficient thermal energy transfer by providing a thermal energy flow path from the battery cells to a refrigerant located in the evaporator.

In another example, a thermal transfer plate is positioned at the base of the battery cells. A series of thermoelectric elements are positioned adjacent to the thermal transfer plate. The thermoelectric elements work cooperatively with the thermal transfer plate to enable rapid and efficient thermal energy transfer by providing a thermal energy flow path from the battery cells to a refrigerant located in the evaporator.

Further forms, objects, features, aspects, benefits, advantages, and examples of the present disclosure will become apparent from a detailed description and drawings provided herewith.

DETAILED DESCRIPTION

Figure 1:
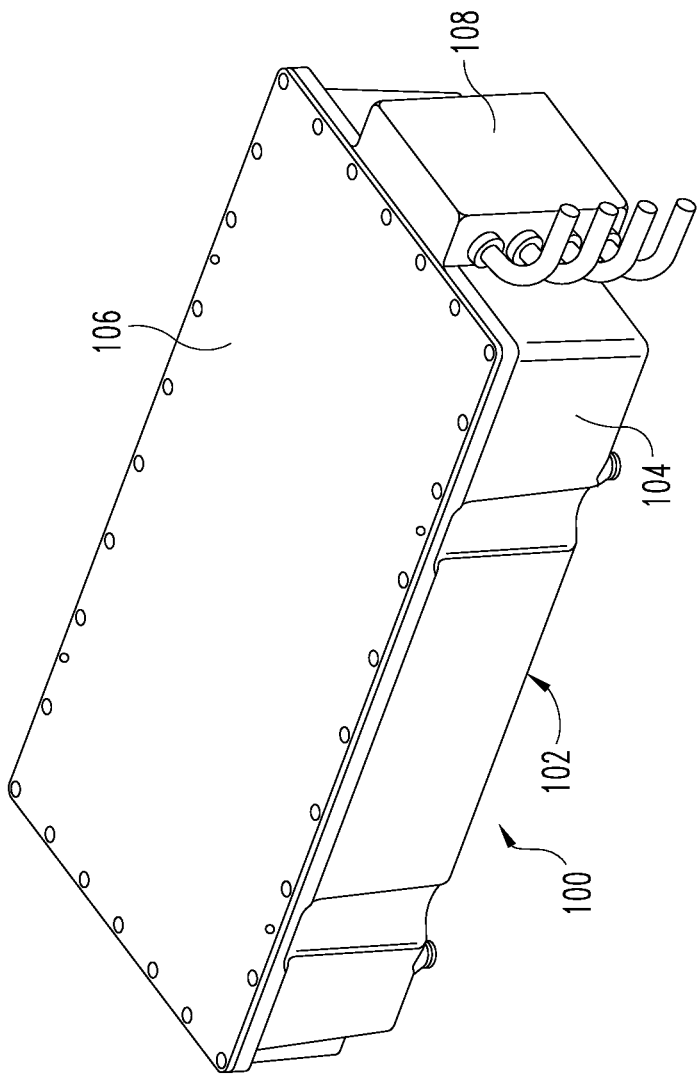
FIG. 1 illustrates a perspective view of an energy storage system.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. It will be apparent to those skilled in the relevant art that some features not relevant to the present invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on.

FIG. 1 shows a perspective view of an energy storage system 100. The energy storage system 100 is adapted for use in hybrid vehicles as well as other types of vehicles or transportation systems and it is also envisioned that various aspects of the energy storage system 100 can be incorporated into other environments. In the context of a hybrid vehicle, the energy storage system 100 receives electrical energy which is generated by an electric motor/generator (not shown). The energy storage system 100 also conversely supplies energy to the electric motor/generator and also to other components such as an inverter, a DC-DC converter, or other components. The energy storage system 100 communicates with an electric motor/generator and other components through the use of high voltage wiring.

The energy storage system 100 includes a housing 102 which provides structural support for the energy storage system 100. The housing 102 includes a plurality of walls 104, a floor (not shown) and a lid 106. The housing 102 generally forms a rectangular shape including four walls 104. The walls 104, floor, and lid 106 provide structural support for the housing 102. The seals between the walls 104, the lid 106, the floor, and other structural aspects of the housing 102 create a hermetically and fluidly sealed environment within the housing 102. The seals can be any seals which are generally known in the art and capable of withstanding high temperature variances and ranges and such as welds or polymer seals.

Located at one end of the housing 102 is a high voltage junction box 108 which facilitates electric signal connections from the energy storage system 100 to an electric motor/generator, inverter, DC-DC converter, or other components which may be part of an electric hybrid vehicle. Although the housing 102 depicted in FIG. 1 is shown as a generally rectangular shape, the depiction is for illustration purposes only, and the housing 102 could be formed as any of a variety of shapes. The housing 102 is preferably constructed of materials having advantageous thermal properties such as aluminum, steel, magnesium, or other types of metals or non-metals. Additionally, the walls 104 can be constructed of a material that has a high resistance to heat and that is structurally sound when undergoing temperature variations or exposure to varied temperature ranges.

Included in at least one wall 104 is a pressure relief valve (not shown). In the case of an increase of internal pressure beyond a target threshold, the pressure relief valve allows gas or fluid to be released from within the housing and prevents cracking or other failure of the housing 102. The pressure relief valve works in one direction and does not allow external air or water inside the enclosure.

Figure 2:
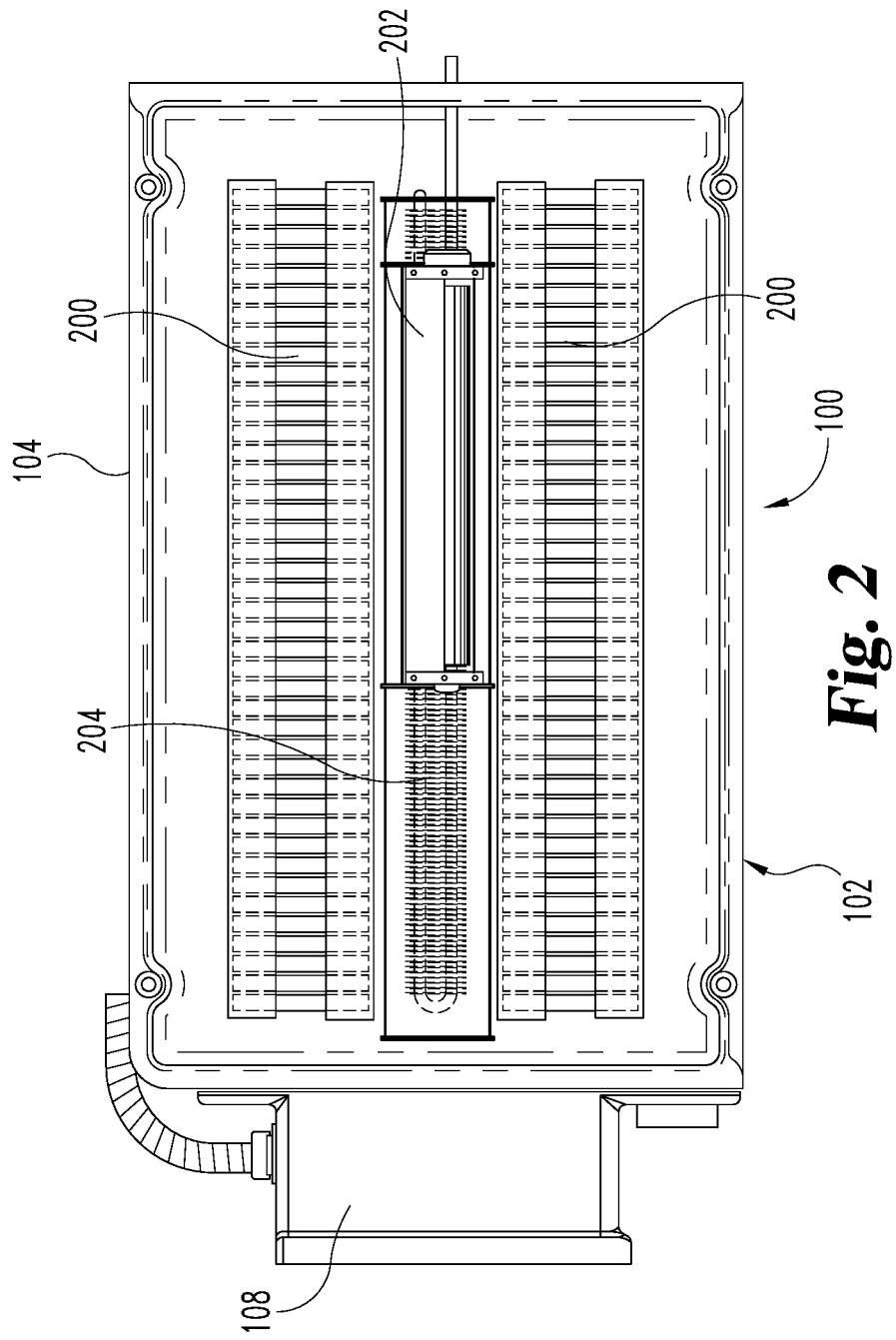
FIG. 2 illustrates a top view of an energy storage system with the lid removed.

FIG. 2 shows a cutaway top view drawing of the energy storage system 100 with the lid 106 removed. Located within the interior of the housing 102 are battery cell arrays 200, a scroll fan 202, and an evaporator 204. The scroll fan 202 is positioned centrally relative to the battery cell arrays 200. Similarly the evaporator 204 is positioned centrally relative to the battery cell arrays 200. The evaporator 204 and scroll fan 202 can be positioned in a variety of configurations within the housing 102.

The battery cell arrays 200 are in essence linked groups of electrochemical batteries for storing energy generated by an electric motor/generator and rapidly supplying the energy back to an electric motor/generator. While the illustrated example shows the energy storage system 100 including two battery cell arrays 200, the energy storage system 100 can include more or fewer battery cell arrays 200 than are shown. The battery cell arrays 200 include individual battery cells which may be daisy chained together in series or parallel according the particular system. The battery cell arrays 200 are connected by signal links which provide an electrical connection and facilitate communication between the various battery cell arrays 200. Similarly, signal links connect the battery cell arrays 200 to the high voltage junction box 108. The data links can include any electrical connectors and signal carriers which are known in the art and suitable for transporting electrical signals in a variable-temperature environment. The individual battery cells of the battery cell arrays 200 include battery walls that seal the internal components of the battery cells. The battery walls are generally constructed from a material such as aluminum, or other metal or non-metal material having high thermal conductivity such that heat energy generated within the battery cells can be rapidly transferred to the exterior surfaces of the battery walls.

Figure 3:
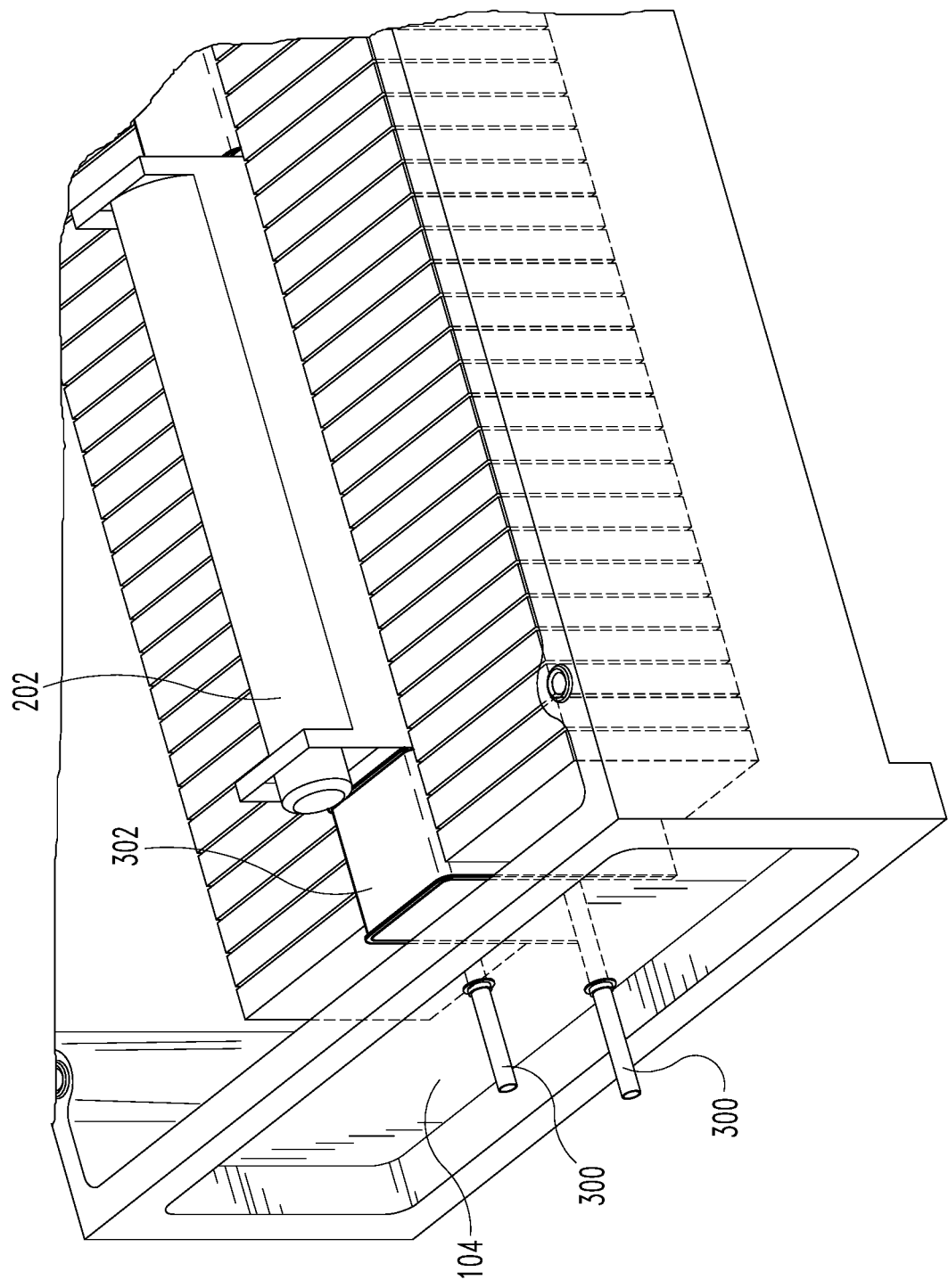
FIG. 3 illustrates a partial perspective view of an energy storage system with the lid removed.

FIG. 3 shows a partial perspective view of the energy storage system 100 with the lid 106 removed. The energy storage system 100 further includes tubes 300 which are fluidly connected to the evaporator 204. The tubes 300 provide a pathway for fluid to travel through the walls 104. The tubes 300 are sealingly integrated with the walls 104 in order to maintain the hermetic integrity of the interior of the housing 102 such that no air can pass through the walls 104 at the point where the tubes 300 pass through the walls 104. The seals can be any of a variety of seals which are known in the art and suitable for variable temperature environments such as compression seals, o-rings, or polymer seals for example.

The scroll fan 202 causes the air within the housing 102 to circulate throughout the housing 102. The scroll fan 202 is shown as being located above the evaporator 204 in a central position relative to the battery cell arrays 200. The depiction of the scroll fan 202 is for illustration purposes only and the scroll fan 202 could be located at other parts of the housing 102. The scroll fan 202 circulates the air throughout the interior of the housing 102 such that the air flows at a generally uniform circulation rate along a flow path through the interior of the housing 102.

The scroll fan 202 is configured as a centrifugal-type pump. Alternatively, the scroll fan 202 can be a positive displacement pump which converts external power to motion of a pump mechanism and causes air to flow through an inlet and outlet. Alternatively, the scroll fan 202 could also be a basic propeller that converts rotational motion into forced fluid flow or any other variety of mechanism which are suitable for causing fluid circulation within the housing 102. The scroll fan 202 can also be any of a variety of air circulators which cause fluid movement and which are known in the art.

The scroll fan 202 is supported by a support member 302 which is positioned within the housing 102. The support member 302 provides a support surface for the scroll fan 202 as well as providing a fluid passageway whereby the scroll fan 202 can cause air to circulate among the battery cells. The support member 302 can provide support for the evaporator 204 or alternately the support member 302 can be attached to and supported by the evaporator 204.

Figure 4:
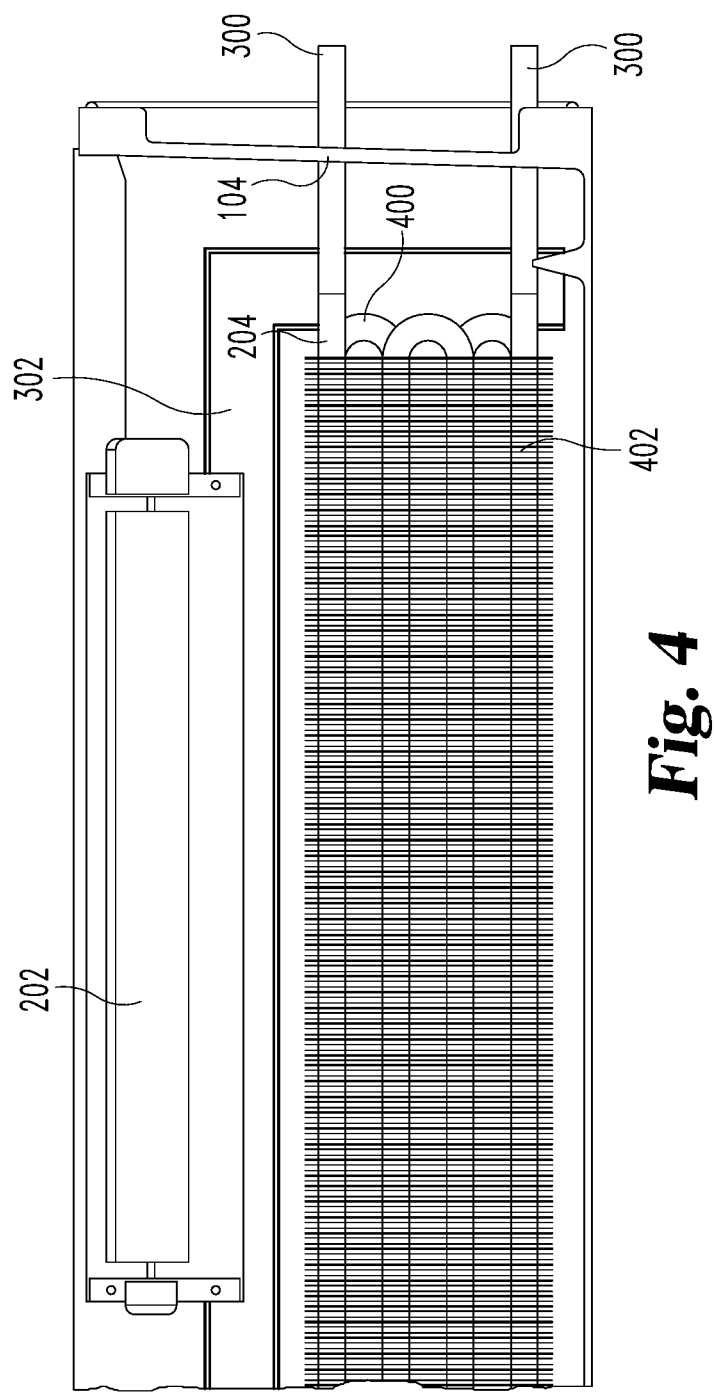
FIG. 4 illustrates a partial cross-sectional side view of an energy storage system.

FIG. 4 shows a partial side cross-sectional view of the energy storage system 100. The evaporator 204 can be any of a variety of evaporators which are suitable for use in refrigeration systems such as, for example, a series of wound evaporator coils 400. The evaporator coils 400 are positioned between the two battery cell arrays 200. The evaporator 204 can include cooling fins 402 which are integrated with the evaporator coils 400. The cooling fins 402 are configured as a series of planar objects which are positioned in a parallel configuration relative to each other. The evaporator coils 400 extend through holes or cutouts in the cooling fins 402 such that the evaporator coils 400 abut against the cooling fins 402. In this way, thermal heat transfer is enabled between the evaporator coils 400 and cooling fins 402. The cooling fins 402 are constructed of a material such as aluminum, or other metal or non-metal material having high thermal conductivity.

The energy storage system 100 is configured to create a thermal energy transfer path whereby the energy storage system 100 efficiently transfers heat energy from the battery cells to the exterior of the housing 102. Generally, the evaporator 204 is part of a refrigeration system whereby the evaporator 204 absorbs thermal heat energy from the battery cells. The scroll fan 202 is configured to circulate air within the housing 102 and more particularly across the cooling fins 402 of the evaporator 204. In this way the scrolling fan 202 increases a convective heat transfer rate occurring at the interface of the cooling fins 402 and the air within the housing 102.

More specifically, the evaporator 204 is part of a refrigeration system which includes a compressor, condenser, expansion valve and the evaporator 204. The components of the refrigeration system are connected together by a fluid-carrying line which generally carries a refrigerant. The refrigeration system operates as a vapor compression cycle in which the refrigerant travels through the refrigerant line and passes through the four components (the compressor, the condenser, the expansion valve, and the evaporator 204). The refrigerant undergoes a thermodynamic transformation during each phase of the vapor compression cycle. The refrigerant can be any of a variety of substances which are suitable for use in a refrigeration cycle such as ammonia or methane.

As part of the refrigeration cycle, the refrigerant enters the evaporator 204 through a tube 300 from an expansion valve as a liquid vapor mixture at a low pressure and low temperature. The refrigerant has a boiling point which is below a target temperature of the interior of the housing 102 such that the refrigerant will necessarily evaporate (or boil) during the evaporation phase. The evaporator 204 enables sufficient thermal contact between the cooling fins 402 and the air inside the housing 102 for the refrigerant to absorb heat energy from the cooling fins 402 and the air. The walls of the evaporator coils 400 are preferably made of a material having high thermal conductivity such as aluminum, for example, in order to maximize the heat energy transfer rate between the refrigerant and the cooling fins 402. Within the evaporator 204, the refrigerant undergoes thermal heat energy transfer with the cooling fins 402 and the air. Because the refrigerant temperature is lower than the mean temperature of the air as well as the cooling fins 402, thermal heat energy flows from the air and cooling fins 402 to the refrigerant. Because the refrigerant is at a low pressure, the refrigerant is able to boil at a low temperature and the refrigerant becomes vaporized. Once vaporized, the refrigerant continues through the tubes 300 and exits the housing 102 where it enters a compressor.

The scroll fan 202 works in conjunction with the evaporator 204 to remove heat energy from the battery cells and also from the energy storage system 100 generally. By causing the air within the housing 102 to circulate within the housing, the air cannot become stagnant such that the portion of air directly surrounding the evaporator coils 400 would become generally lower in temperature than the mean temperature of the air within the housing 102. The scroll fan 202 ensures that the air which flows across the cooling fins 402 and the evaporator coils 400 is of sufficiently high temperature to maximize the heat energy transfer rate from the air to the refrigerant travelling through the evaporator coils 400.

As will be appreciated by those skilled in the art, the rate of heat transfer by convection from one medium to another is directly proportional to the surface area of the medium from which heat energy is transferred as well as the difference in temperature between the two mediums. Additionally, the rate of heat transfer by conduction between two points is directly proportional to the difference in temperature between the two points and the thermal conductivity of the medium through which the heat energy is being transferred. The energy storage system 100 is designed to increase heat energy transfer from the battery cells to the refrigerant. The cooling fins 402 present an increased amount of surface area through which the convective heat transfer rate from the air within the housing 102 to the refrigerant in the evaporator 204 is increased. Through use of the cooling fins 402, an increased amount of heat energy is transferred conductively to the evaporator coils 400 and subsequently to the refrigerant in the evaporator 204. In this way, the cooling fins 402 work in conjunction with the scroll fan 202 to cause an increased heat energy transfer rate from the battery cells to the refrigerant within the evaporator 204.

Through testing, it was determined that with an appropriately sized 12 vdc or 24 vdc refrigeration system, a total steady-state heat dissipation of 600 W can be achieved while maintaining battery cell temperatures below 45 degrees Celsius. According to this analysis, the scroll fan 202 imparts 30 cfm to 40 cfm of air circulation through the evaporator and across the battery cells.

It is understood by those skilled in the art that high-voltage battery cells daisy-chained together in close proximity can generate a substantial amount of heat energy when charging or discharging. The heat energy buildup within the battery cell arrays 200 causes heat energy to be conductively transferred to the individual battery walls. In this way, at various times during operation of the energy storage system 100, if no heat energy management system is in place, the battery cells and battery walls could reach substantially high temperatures and cause catastrophic failure to the system. For example, cell thermal runaway could occur when rising temperatures of a battery cell causes a chemical reaction in which further heat energy is released within the battery cell. Further, the heat energy from one battery cell undergoing cell thermal runaway could spread to adjacent battery cells, subsequently causing an increased temperature in the adjacent battery cells. In this way, a chain reaction of multiple failing battery cells within the energy storage system 100 could occur. A battery failure could cause gas to be released from the battery cell into the housing 102, increasing the internal pressure of the sealed housing 102. If the internal pressure increases beyond a pre-determined threshold, the pressure relief valve activates and prevents further failure of the energy storage system 100. Yet the pressure relief valve is a backup system only, as the energy storage system 100 includes a means for rapid and efficient heat energy transfer from the battery cell arrays 200 to the exterior of the housing 102, thereby preventing an overheating scenario.

Figure 5:
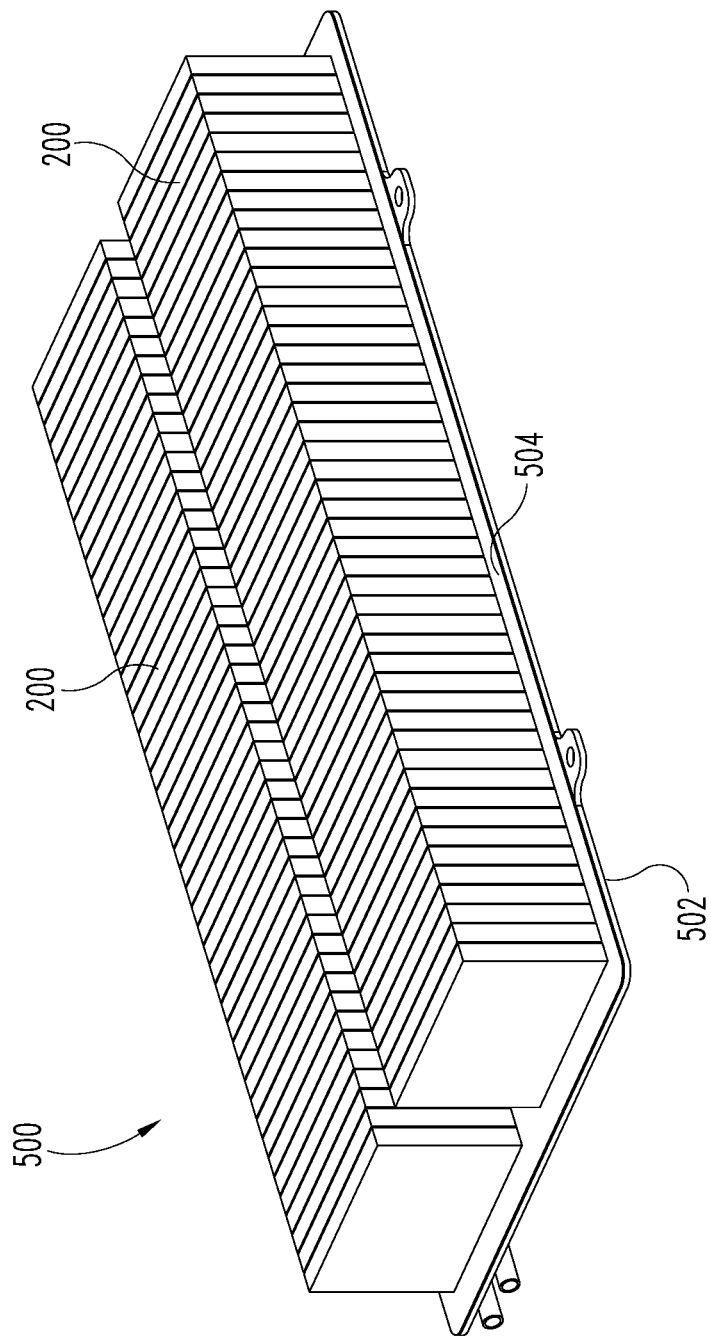
FIG. 5 illustrates a partial perspective view of an energy storage system without walls or a lid.

An alternative example of the current concept is shown in FIG. 5. FIG. 5 shows a partial perspective view of an energy storage system 500 having two rows of battery cell arrays 200. The energy storage system 500 is generally constructed having walls and a lid as described previously but which are not shown in FIG. 5. The energy storage system 500 is a closed system such that the interior of the energy storage system 500 is hermetically sealed from the exterior environment. The energy storage system 500 includes a thermal transfer plate 502 at the base of the energy storage system 500. Also included is an optional dielectric layer 504. The thermal transfer plate provides support for the battery cell arrays 200 as well as other components located within the energy storage system 500. The thermal transfer plate 502 generally extends along the entirety of the bottom surface of the battery cell arrays 200. The thermal transfer plate 502 is generally constructed of a metal or other material having a high thermal conductivity such as aluminum for example.

The dielectric layer 504 is generally positioned between the thermal transfer plate and the battery cell arrays 200. The dielectric layer 504 extends along the thermal transfer plate 502 at least to the extent that it extends throughout the entirety of the base of the battery cell arrays 200. The dielectric layer provides a layer of electric insulative protection between the battery cell arrays 200 and the thermal transfer plate 502. Any of a variety of dielectric layers can be used for the dielectric layer 504 such as a variety of plastics, glass, porcelain and other materials. Preferably, the dielectric layer 504 also has high thermal conductivity such that it provides thermal transfer between the battery cell arrays 200 and the thermal transfer plate 502. Preferably, the dielectric layer 504 has a thickness of 1 mm. The dielectric layer 504 can also have a thickness greater or less than 1 mm.

Figure 6:
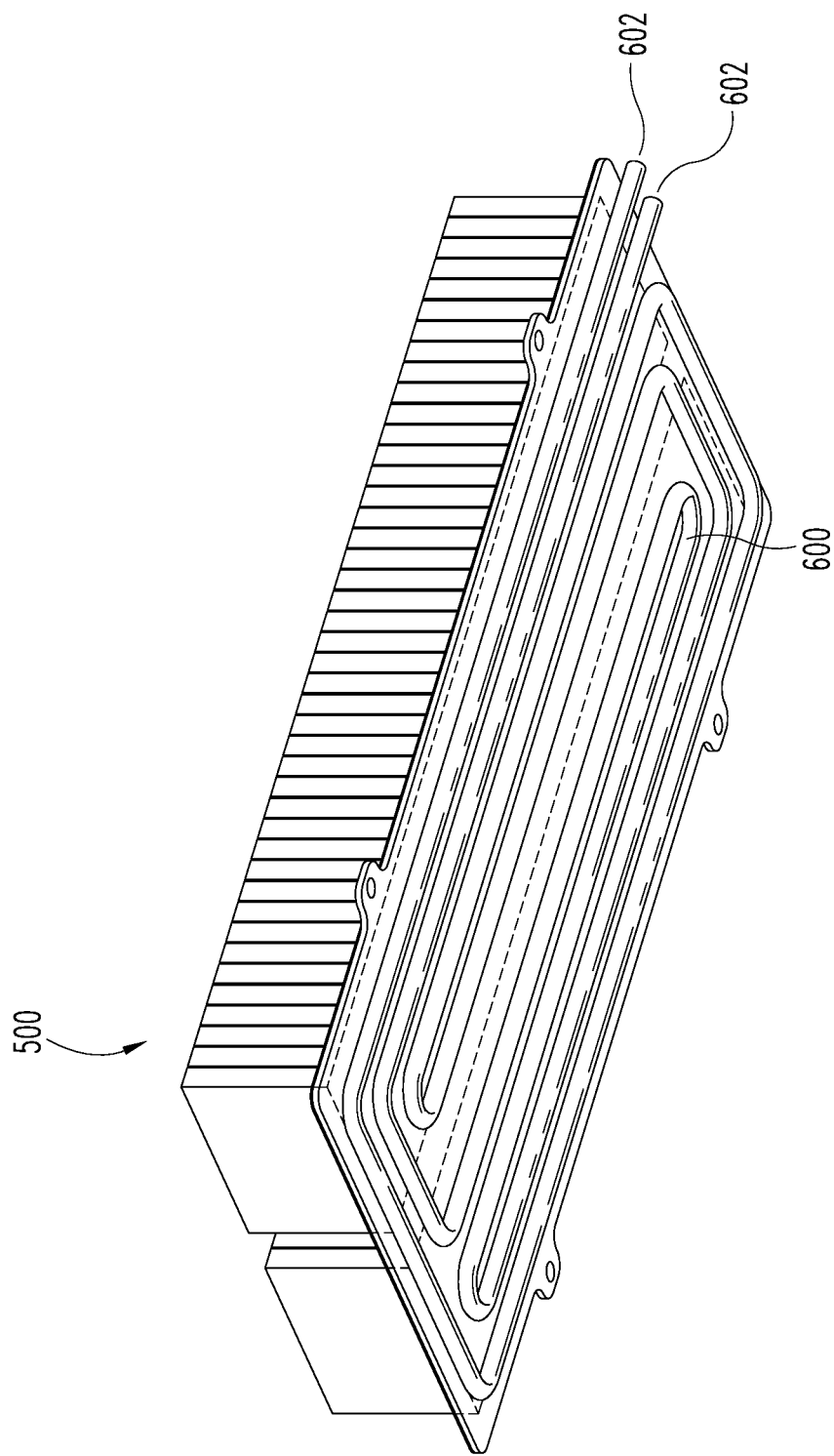
FIG. 6 illustrates a partial perspective view of an energy storage system without walls or a lid.

FIG. 6 shows an alternative perspective view of the energy storage system 500. The energy storage system 500 also includes an evaporator having evaporator coils 600. The evaporator coils 600 are positioned along a surface of the thermal transfer plate 502 such that they abut the thermal transfer plate 502. The evaporator coils 600 include fluid transfer tubes 602. The evaporator and evaporator coils 600 are part of a refrigeration system including a compressor, condenser and expansion valve operating under a vapor compression cycle as described previously. The arrangement of the evaporator coils 600 shown in FIG. 6 are for illustrative purposes only and any of a variety of coil arrangements could be used. The evaporator coils 600 are configured to carry a refrigerant which enters and exit the coils through the tubes 602. The evaporator coils 600 and thermal transfer plate 502 can be located within the interior of the energy storage system 500 such that the evaporator coils 600 are within the hermetically sealed portion of the energy storage system 500. Alternatively, the evaporator coils could be located external to the hermetically sealed interior of the energy storage system 500 such that the thermal transfer plate provides a thermal energy pathway from the interior of the energy storage system to the exterior of the energy storage system.

As described previously, the evaporator coils 600 carry a low temperature refrigerant which provides a conductive heat transfer pathway from the battery cell arrays 200 to the refrigerant within the evaporator coils 600. As discussed previously, as the battery cells generate heat, the heat energy must be dissipated to avoid catastrophic failure. Due to the difference in temperature between the battery cells and the refrigerant in the evaporator coils 600, a thermal pathway is created whereby the heat energy is transferred from the battery cell arrays 200 through the thermal transfer plate 502, through the walls of the evaporator coils 600 and to the refrigerant. In this way the energy storage system 500 provides an efficient means to transfer heat energy from the battery cell arrays 200.

Figure 7:
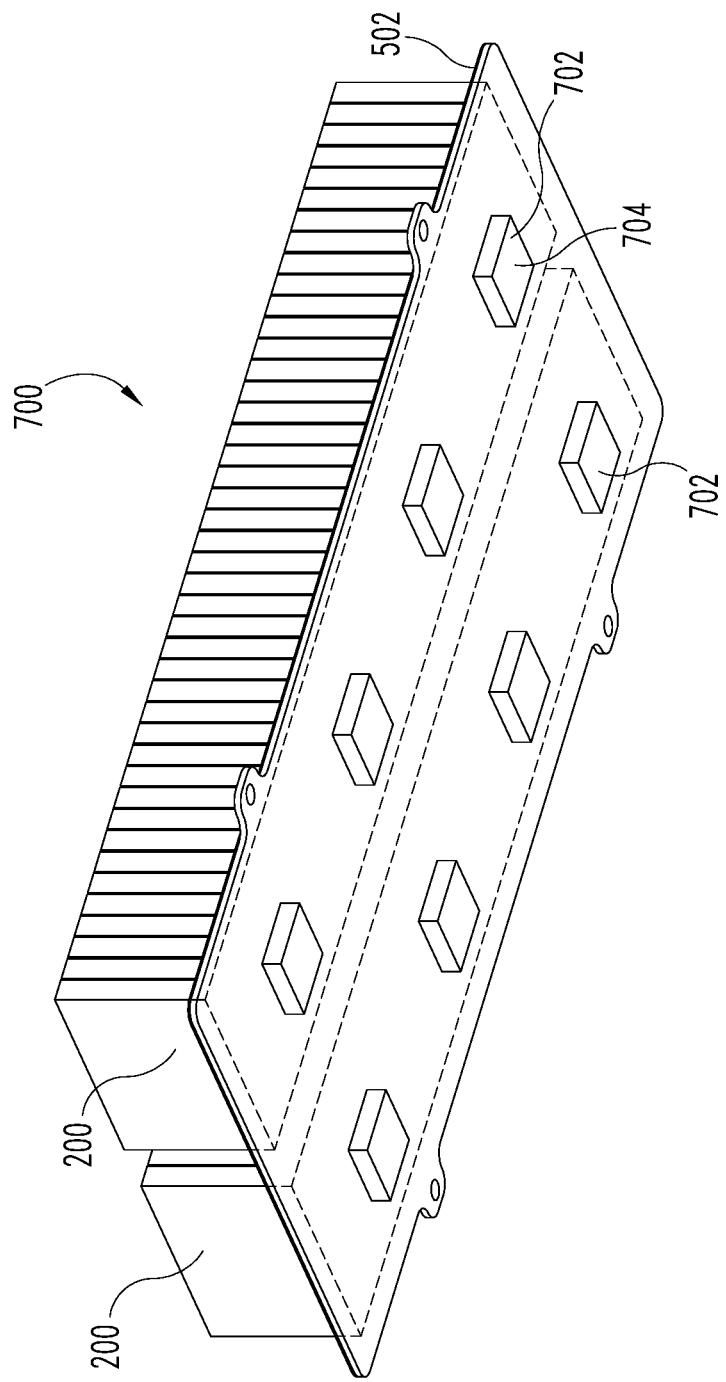
FIG. 7 illustrates a partial perspective view of an energy storage system without walls or a lid.

An alternative example of the current concept is shown in FIG. 7. FIG. 7 shows a perspective view of an energy storage system 700 having two battery cell arrays 200. The energy storage system 700 is generally constructed having walls and a lid as described previously but which are not shown in FIG. 7. The energy storage system 700 is a closed system such that the interior of the energy storage system 700 is hermetically sealed from the exterior environment. The energy storage system 700 includes a thermal transfer plate 502 at the base of the energy storage system 700. Also included is an optional dielectric layer 504 as previously described. The thermal transfer plate 502 provides support for the battery cell arrays 200 as well as other components located within the energy storage system 700. The thermal transfer plate 502 generally extends along the entirety of the bottom surface of the battery cell arrays 200. The thermal transfer plate 502 is generally constructed of a metal or other material having a high thermal conductivity such as aluminum for example.

Located on the bottom of the thermal transfer plate 502 are a series of thermoelectric elements 702. The thermoelectric elements 702 are of a type that uses a heat flux between the junctions of two different types of materials. The thermoelectric elements 702 can be any of a variety of coolers, one of which is a Peltier type element in which p-type and n-type semiconductors are thermally arranged in parallel and electrically arranged in series. When a current is caused to flow through the Peltier element, heat absorption and heat dissipation occur on the differing surfaces due to the Peltier effect. By applying an electric potential to the thermoelectric elements 702, a temperature differential is achieved where the bottom surface 704 of the thermoelectric elements 702 is maintained at a higher temperature than the top surface of the thermoelectric elements 702. By maintaining a lower temperature on the top surface of the thermoelectric elements 702, a thermal pathway is created from the battery cell arrays 200 to the thermoelectric elements 702. In this way, the heat energy flows from the battery cells, through the thermal transfer plate 502 and to the thermoelectric elements 702.

The thermoelectric elements 702 can be arranged as shown in FIG. 7 or alternatively they can be arranged in a variety of different arrangements. Additionally, a variety of different quantities of thermoelectric elements 702 can be used. For example, two thermoelectric elements 702 could be used or eight or sixteen thermoelectric elements 702 could be used. The energy storage system 700 can be constructed such that the battery cell arrays and thermoelectric plate are located within a hermetically sealed environment while the thermoelectric elements 702 are located outside or exterior relative to the hermetically sealed environment.

The concept described herein and various embodiments are configured to be used with a controller and other electrical hardware that provides control functions for the energy storage systems. For example, the controller controls the operation of the scroll fan 202 as well as operation of the evaporator coils 400. Typically, a variety of sensors will be located within each energy storage system such as temperature and pressure sensors and as well as voltage and other power sensors. Controllers additionally supply electric energy power and signals to various components such as the thermoelectric elements 702.

When used with a vehicle, the evaporator and refrigeration system described herein can include a complete vapor compression cycle and components which are solely dedicated to the energy storage system and located in components external to the energy storage systems and housings described herein. Alternatively, the evaporators can also be combined with a condenser which serves other purposes within a vehicle.

While the invention has been illustrated and described in detail in the drawings and foregoing description, the same is to be considered as illustrative and not restrictive in character, it being understood that only the preferred embodiments have been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An apparatus comprising:
    a housing;
    a first battery cell array positioned inside the housing;
    a second battery cell array positioned inside the housing so that the first battery cell array and the second battery cell array extend substantially parallel to each other;
    a thermal transfer plate, wherein the first battery cell array and the second battery cell array are positioned adjacent to a first side of the thermal transfer plate;
    a dielectric layer made from a dielectric material positioned between the thermal transfer plate and the first battery cell array; and
    a plurality of thermoelectric elements adjacent to a second side of the thermal transfer plate, wherein the thermal transfer plate is coupled to the housing; and
    wherein the plurality of thermoelectric elements are arranged so that there is a first row of thermoelectric elements aligned with the first battery cell array and a second row of thermoelectric elements aligned with the second battery cell array.

2. The apparatus of claim 1, wherein the thermoelectric element is in direct contact with the second side of the thermal transfer plate.

3. The apparatus of claim 1, wherein the first side of the thermal transfer plate is inside the housing, and wherein the second side of the thermal transfer plate is outside the housing.

4. The apparatus of claim 1, wherein the thermoelectric element is a Peltier type element.

5. The apparatus of claim 1, wherein the housing further comprises:
    at least one wall;
    a cover; and
    a floor, wherein the first battery cell array is adjacent to the floor, and wherein the floor, the cover, and the at least one wall are arranged and configured to enclose the first battery cell array.

6. The apparatus of claim 5, wherein the housing further comprises:
    a sealing member, wherein the sealing member is positioned between the cover and the at least one wall, and wherein the housing is hermetically sealed.

7. The apparatus of claim 5, wherein the floor includes the thermal transfer plate.

8. The apparatus of claim 1, wherein the thermal transfer plate extends along the entirety of the bottom surface of the first battery cell array.

9. The apparatus of claim 1, wherein the thermoelectric element uses a heat flux between the junctions of two different types of materials to create the temperature differential in the thermoelectric element.

10. The apparatus of claim 1, wherein the second side of the thermal transfer plate is the bottom of the thermal transfer plate and wherein the thermoelectric element is in contact with the bottom of the thermal transfer plate.

11. The apparatus of claim 1, wherein the dielectric layer is positioned between the thermal transfer plate and the second battery cell array.

12. The apparatus of claim 5, wherein the cover and the at least one wall are arranged and configured to enclose the second battery cell array within the housing.

13. The apparatus of claim 1, wherein the dielectric layer extends along the thermal transfer plate at least to the extent that it extends along the entirety of the bottom surface of the second battery cell array.

14. The apparatus of claim 1, further comprising:
    a controller electrically connected to the thermoelectric element, wherein the controller is configured to control an electric current to the thermoelectric element; and
    wherein the electric current supplied to the thermoelectric element causes a temperature differential in the thermoelectric element that creates a thermal pathway between the first battery cell array and the thermoelectric element.

15. The apparatus of claim 1, wherein the dielectric layer extends along the thermal transfer plate at least to the extent that it extends along the entirety of the bottom surface of the first battery cell array.

16. The apparatus of claim 1, wherein the dielectric layer has a thickness of at least 1 mm.

17. The apparatus of claim 1, wherein the dielectric layer provides thermal transfer between the first battery cell array and the thermal transfer plate.

18. The apparatus of claim 1, wherein the plurality of thermoelectric elements are positioned exterior to the housing.

* * * * *